US012493022B2

(12) United States Patent
Lu et al.

(10) Patent No.: US 12,493,022 B2
(45) Date of Patent: Dec. 9, 2025

(54) EXPERIMENTAL SYSTEM AND EXPERIMENTAL EVALUATION METHOD FOR PULSED DISPLACEMENT AND REPLACEMENT OF METHANE WITH CARBON DIOXIDE

(71) Applicants: CHONGQING INSTITUTE OF GEOLOGY AND MINERAL RESOURCES, Chongqing (CN); Chongqing University, Chongqing (CN)

(72) Inventors: Yiyu Lu, Chongqing (CN); Zhaohui Lu, Chongqing (CN); Jiankun Zhou, Chongqing (CN); Jiren Tang, Chongqing (CN); Yunzhong Jia, Chongqing (CN)

(73) Assignees: CHONGQING INSTITUTE OF GEOLOGY AND MINERAL RESOURCES, Chongqing (CN); Chongqing University, Chongqing (CN)

( * ) Notice: Subject to any disclaimer, the term of this patent is extended or adjusted under 35 U.S.C. 154(b) by 541 days.

(21) Appl. No.: 18/012,945

(22) PCT Filed: Apr. 12, 2022

(86) PCT No.: PCT/CN2022/086432
§ 371 (c)(1),
(2) Date: Dec. 26, 2022

(87) PCT Pub. No.: WO2023/130603
PCT Pub. Date: Jul. 13, 2023

(65) Prior Publication Data
US 2023/0324354 A1    Oct. 12, 2023

(30) Foreign Application Priority Data

Jan. 7, 2022  (CN) .......................... 202210014957.6

(51) Int. Cl.
*G01N 33/24* (2006.01)
*G01N 33/00* (2006.01)
*G01V 20/00* (2024.01)

(52) U.S. Cl.
CPC .......... *G01N 33/004* (2013.01); *G01N 33/24* (2013.01); *G01V 20/00* (2024.01)

(58) Field of Classification Search
CPC ...... G01N 33/004; G01N 33/24; G01N 30/02; G01N 33/00; G01V 20/00; G01D 21/02; G01D 21/00
See application file for complete search history.

(56) References Cited

U.S. PATENT DOCUMENTS

| | | | |
|---|---|---|---|
| 2020/0017782 A1* | 1/2020 | Chandran | F23G 5/30 |
| 2021/0284924 A1* | 9/2021 | Chandran | C10K 1/101 |
| 2022/0145462 A1* | 5/2022 | Malila | C23C 16/45544 |

FOREIGN PATENT DOCUMENTS

| | | |
|---|---|---|
| CN | 202229179 | 5/2012 |
| CN | 106093345 | 11/2016 |

(Continued)

OTHER PUBLICATIONS

"International Search Report (Form PCT/ISA/210) of PCT/CN2022/086432," mailed on Jul. 27, 2022, pp. 1-4.

(Continued)

*Primary Examiner* — Mohamed Charioui
(74) *Attorney, Agent, or Firm* — JCIPRNET

(57) ABSTRACT

An experimental system for a pulsed displacement and replacement of methane with carbon dioxide is provided. The experimental system includes a gas supply system, a pulse control system, a reservoir environment simulation system, a data acquisition and processing system and a tail gas recovery system, connected in sequence; and the carbon dioxide output from the gas supply system is converted into a pulsed gas through the pulse control system, the pulsed gas (Continued)

enters the reservoir environment simulation system to shorten a time of displacing and replacing methane with carbon dioxide, the experimental data of the reservoir environment simulation system is recorded in real time, analyzed and processed by the data acquisition and processing system, a dynamic displacement process is reflected in real time, and a relationship between a displacement evaluation indicator and a displacement time is clarified. The disclosure further provides an experimental evaluation method, using the above experimental system.

8 Claims, 2 Drawing Sheets

(56) References Cited

FOREIGN PATENT DOCUMENTS

| | | |
|---|---|---|
| CN | 108414419 | 8/2018 |
| CN | 108414727 | 8/2018 |
| CN | 109975140 | 7/2019 |

OTHER PUBLICATIONS

"Written Opinion of the International Searching Authority (Form PCT/ISA/237) of PCT/CN2022/086432," mailed on Jul. 27, 2022, pp. 1-4.

\* cited by examiner

EXPERIMENTAL SYSTEM AND EXPERIMENTAL EVALUATION METHOD FOR PULSED DISPLACEMENT AND REPLACEMENT OF METHANE WITH CARBON DIOXIDE

CROSS-REFERENCE TO RELATED APPLICATION

This is a 371 application of International Application No. PCT/CN2022/086432, filed on Apr. 12, 2022, which claims the priority benefits of China Application No. 202210014957.6, filed on Jan. 7, 2022. The entirety of each of the above-mentioned patent applications is hereby incorporated by reference herein and made a part of this specification.

TECHNICAL FIELD

The disclosure relates to a technical field of natural gas exploitation, in particular, to an experimental system and an experimental evaluation method for a pulsed displacement and replacement of methane ($CH_4$) with carbon dioxide ($CO_2$).

DESCRIPTION OF RELATED ART

The petroleum and natural gas are used as an important strategic energy source of the country and have an important significance in the national economic development. In recent years, unconventional natural gas, including coalbed methane (CBM), shale gas, etc., has also developed rapidly in China. Efficient exploitation and utilization of the petroleum and natural gas can effectively relieve the energy tension. As $CO_2$ is used as a greenhouse gas, large-scale emissions of $CO_2$ causes serious environmental damage, resulting in rising temperatures and sea levels. It can effectively reduce the viscosity of petroleum, replace natural gas and improve the yield of oil gas by displacing and replacing the petroleum and natural gas with $CO_2$. In addition, it can also permanently store carbon dioxide hydrate in an underground reservoir by displacing and replacing the petroleum and natural gas, thereby being a feasible method for reducing $CO_2$ emission. The advantage of the displacement and replacement of the petroleum and natural gas with $CO_2$ is that $CO_2$ injection into the stratum can improve the energy of the oil gas layer, reduce the viscosity of the petroleum, and facilitate the flow of the petroleum in the stratum. The adsorption capacity of $CO_2$ on shale and coal rock is greater than that of methane ($CH_4$), and when $CO_2$ is injected, the $CH_4$ replacement efficiency can be effectively improved, and the yield of the natural gas can be increased. On one hand, with the increase of the emission reduction pressure of the greenhouse gas, $CO_2$ is injected into the stratum to displace and replace oil gas, so that the emission of $CO_2$ in the atmosphere can be reduced, the stability of an oil gas reservoir is maintained, and the environmental-friendly value and the economic value are achieved.

At present, the development technology of $CO_2$ applied to oil gas is not mature yet. The effect of improving the yield is controlled by different oil gas reservoir geological backgrounds. The difference of the attached states of different natural gases in the stratum is large, such as the viscosity of the petroleum and the occurrence state of the natural gas in the stratum. Different strata also have different structural forms, such as fracture development, stratigraphic dip, etc. The efficiency and effect of the $CO_2$ replacement and displacement under different oil gas stratum geological backgrounds are not clear, and the replacement effect of the $CO_2$ replacement and displacement under different oil gas saturations and natural gas attachment statuses has not been quantitatively evaluated, so that experimental equipment is required for simulation.

In the prior art, some scholars have studied the effect of the displacement and replacement of $CH_4$ in reservoir with $CO_2$, and designed experimental devices to simulate the displacement process. However, due to the low porosity, low permeability and other characteristics of unconventional natural gas reservoirs such as CBM, shale, etc., the mobility of gas therein is very poor, resulting in a long time required for the process of the steady state (constant pressure or constant flow) of the displacement and replacement of $CH_4$ with $CO_2$. Meanwhile, the existing device for the displacement and replacement of $CH_4$ with $CO_2$ can only obtain a final displacement indicator after the displacement is completed, which cannot reflect the dynamic displacement process in real time, leading to the failure to clarify the relationship between the displacement evaluation indicator and the displacement time.

SUMMARY

The purpose of the disclosure is to provide an experimental system and an experimental evaluation method for a pulsed displacement and replacement of $CH_4$ with $CO_2$, so as to solve the problems that the existing devices for the displacement and replacement of $CH_4$ with $CO_2$ have a long displacement and replacement time and cannot reflect the dynamic displacement process in real time, leading to the failure to clarify the relationship between the displacement evaluation indicator and the displacement time.

In order to achieve the above purposes, the technical feature adopted by the disclosure is as follows:

an experimental system for a pulsed displacement and replacement of $CH_4$ with $CO_2$ includes a gas supply system, a pulse control system, a reservoir environment simulation system, a data acquisition and processing system and a tail gas recovery system which are connected in sequence;

the gas supply system provides a gas source for the reservoir environment simulation system, and the gas source includes $CO_2$, $CH_4$ and an inert gas;

the pulse control system provides a pulse for the gas source to convert a gas passing through the pulse control system into a pulsed gas;

the reservoir environment simulation system simulates a temperature environment and a pressure environment of different reservoirs;

the data acquisition and processing system records in real time, analyzes and processes an experimental data of the reservoir environment simulation system;

the tail gas recovery system recovers and processes a tail gas of the reservoir environment simulation system; and the $CO_2$ gas output from the gas supply system is converted into the pulsed gas by passing through the pulse control system, the pulsed gas enters the reservoir environment simulation system to shorten a time of displacing and replacing $CH_4$ with $CO_2$ gas, the experimental data of the reservoir environment simulation system is recorded in real time, analyzed and processed by the data acquisition and processing system, a dynamic displacement process is reflected in real time, and a relationship between a displacement evaluation indicator and a displacement time is clarified.

Preferably, the gas supply system comprises a $CO_2$ supply system, a $CH_4$ supply system and an inert gas supply system which are connected in parallel with each other through gas pipelines; and the $CO_2$ supply system and the $CH_4$ supply system are connected in parallel, then connected with a first flowmeter, then further connected in parallel with the inert gas supply system, and then connected with the reservoir environment simulation system.

Preferably, the $CO_2$ supply system comprises a $CO_2$ cylinder, a $CO_2$ gas pressure reducing valve, a first piston and a second stop valve which are connected in sequence;

the $CH_4$ supply system comprises a $CH_4$ cylinder, a $CH_4$ gas pressure reducing valve, a second piston and a third stop valve which are connected in sequence;

the inert gas supply system comprises an inert gas cylinder, an inert gas pressure reducing valve, a third piston and a fourth stop valve which are connected in sequence; and the three pistons are all connected with a hydraulic pump, an outlet end of the second stop valve and an outlet end of the third stop valve are connected in parallel, and then connected with an inlet end of the first flowmeter, and an outlet end of the first flowmeter is connected in parallel with an outlet end of the fourth stop valve.

Preferably, the pulse control system comprises a pulse generator, a pulse solenoid valve and an upstream buffer chamber which are connected in sequence;

the pulse solenoid valve and the upstream buffer chamber are connected between the first piston and the second stop valve in the $CO_2$ supply system through a first stop valve, and the $CO_2$ gas passing through the pulse solenoid valve is applied the pulse through the pulse generator to shorten the time of displacing and replacing $CH_4$ with $CO_2$; and the pulse generator is connected with the data acquisition and processing system to record in real time and feedback pulse parameters.

Preferably, the reservoir environment simulation system comprises a constant temperature water bath device, the constant temperature water bath device is provided with a calibration tank and a core holder, an inlet end of the calibration tank and an inlet end of the core holder are connected respectively through the fifth stop valve and the sixth stop valve with a gas pipeline after the first flowmeter and the fourth stop valve are connected in parallel, the inlet end of the fifth stop valve and the inlet end of the sixth stop valve are further connected with a first pressure sensor, and an outlet end of the core holder is connected with a vacuum pump and a second pressure sensor through a eighth stop valve;

the core holder is fixed with a core specimen and a temperature sensor;

a seventh stop valve is arranged in parallel between the inlet end and the outlet end of the core holder; and the core holder is further connected with a plunger pump.

Preferably, the pulse control system further includes a downstream buffer chamber and a back pressure valve which are connected in sequence, an inlet end of the downstream buffer chamber is connected with the outlet end of the core holder, and an outlet end of the back pressure valve is connected with a ninth stop valve and a second flowmeter in sequence.

Preferably, the data acquisition and processing system includes the first flowmeter, the second flowmeter, the first pressure sensor, the second pressure sensor and the temperature sensor; and the data acquisition and processing system further includes a data acquisition terminal, wherein the first flowmeter, the second flowmeter, the first pressure sensor, the second pressure sensor and the temperature sensor are all connected with the data acquisition terminal, and the pulse generator is connected with the data acquisition terminal.

Preferably, the tail gas recovery system comprises a gas chromatograph and a tail gas recovery tank which are connected with each other, wherein an inlet end of the gas chromatograph is connected with an outlet end of the second flowmeter, and the gas chromatograph is further connected with the data acquisition terminal.

The disclosure further provides an experimental evaluation method for a pulsed displacement and replacement of $CH_4$ with $CO_2$, comprising the experimental system for the pulsed displacement and replacement of $CH_4$ with $CO_2$ in the disclosure.

Preferably, the experimental evaluation method for the pulsed displacement and replacement of $CH_4$ with $CO_2$ includes the following steps:

S1. setting an initial condition: installing the core specimen in the reservoir environment simulation system, adjusting a temperature and a pressure around the core specimen to reach a set value, turning on the data acquisition terminal in the data acquisition and processing system, checking whether each instrument works normally, and turning off all stop valves after the setting is completed;

S2. checking a gas tightness of a device: turning on the inert gas in the gas supply system, pressurizing the inert gas until a pressure is higher than a maximum test pressure, allowing the pressurized inert gas to enter a pipeline, and when the pressure becomes stable and is equal to the pressurized pressure, turning off a valve; and standing still, if the pressure is not reduced, carrying out subsequent operations;

S3. calibrating a free space volume: exhausting the inert gas in the pipeline and the core specimen; after the pressure is no longer reduced, vacuumizing the pipeline and the core specimen, and when the pressure is stable, turning off the valve; turning on an inert gas pipeline, then introducing the inert gas, and then turning off the valve on the inert gas pipeline; and recording the stabilized pressure;

allowing the inert gas in the gas pipeline to enter the calibration tank, and after the pressure is stabilized again, recording the pressure at the moment; and obtaining a first formula for calculating the free space volume of the gas pipeline according to a gas state equation and Boyle's law;

after the inert gas is continuously introduced, turning off the valve on the inert gas pipeline, and after the pressure is stable, recording the pressure at the moment; turning on a valve of a gas inlet of the core specimen, and after the pressure is stable, recording the pressure at the moment; and obtaining a second formula for calculating the free space volume of the gas pipeline according to the gas state equation and the Boyle's law;

turning on a valve connected with the gas inlet and a gas outlet of the core specimen, and after the pressure is stable and no longer reduced, recording the pressure at the moment; and obtaining a third formula and a fourth formula for calculating the free space volume of the gas pipeline according to the gas state equation and the Boyle's law; and calculating the free space volumes by the first formula, the second formula, the third formula and the fourth formula;

S4. vacuumizing: after the operation of S3 is completed, exhausting the gas in the gas pipeline and the core specimen; after the pressure is no longer reduced significantly, vacuumizing the gas pipeline and the core specimen; and when the pressure is stable, turning off the valves in sequence;

S5. pre-adsorbing and saturating $CH_4$: pressurizing the $CH_4$ gas to a set adsorption pressure, and then introducing the $CH_4$ into the core specimen; and when the pressure reaches the set adsorption pressure and remains stable, considering that the $CH_4$ has been adsorbed to be saturated in the core specimen;

S6. pulsed displacing and replacing $CH_4$ with $CO_2$: pressurizing the $CO_2$ gas to a pulsed peak pressure; and forming the carbon dioxide pulsed gas by passing the carbon dioxide gas through the pulse control system, then allowing the carbon dioxide pulsed gas to reach at the core specimen, and then to displace and replace the methane gas inside the core specimen, then analyzing a component and an amount of the mixed gas, and then exhausting the mixed gas to the tail gas recovery system;

S7. calculating the displacement evaluation indicator after the displacement is finished: after the displacement is finished, obtaining a total storage capacity of $CO_2$ and a total recovery capacity of the stored $CH_4$ according to the ideal gas state equation, thereby obtaining a displacement and replacement ratio;

S8. changing conditions for the next group of experiments: after the above steps are completed, changing pulse parameters and environmental conditions according to an experimental design scheme, repeating steps S1-S7, thereby simulating an effect of the pulsed displacement and replacement of $CH_4$ with $CO_2$ under different pulse parameters and environmental conditions, and determining a $CO_2$ pulsed pressure parameter for different reservoir environments, thereby improving a $CH_4$ recovery rate and a exploitation efficiency.

More preferably, the experimental evaluation method for the pulsed displacement and replacement of $CH_4$ with $CO_2$ includes the following steps:

S1. setting the initial condition: installing the core specimen in the core holder of the reservoir environment simulation system, turning on the constant temperature water bath device to heat the core specimen to the set temperature, adjusting the plunger pump to allow the pressure around the core specimen to reach the set pressure, turning on the data acquisition terminal, checking whether each sensor and flowmeter works normally, and turning off all the stop valves after the setting is completed;

S2. checking the gas tightness of the device: turning on the fourth stop valve, the fifth stop valve, the sixth stop valve and the seventh stop valve, turning on the inert gas pressure reducing valve, pressurizing the inert gas through the hydraulic pump and the third piston until the pressure is slightly higher than the maximum test pressure, allowing the pressurized inert gas to enter the pipeline, and when a reading of the first pressure sensor and a reading of the second pressure sensor become stable and are equal to the pressurized pressure of the hydraulic pump, turning off the fourth stop valve, the inert gas pressure reducing valve and hydraulic pump in sequence; and standing still, if the reading of the first pressure sensor and the reading of the second pressure sensor are not reduced, considering being good on the gas tightness of the device for carrying out the subsequent operations; otherwise, repeating this step after checking a pipeline connection;

S3. calibrating the free space volume: remaining an on-state and an off-state of other valves, turning on the ninth stop valve to exhaust the inert gas in the gas pipeline and the core specimen; after the reading of the pressure sensor is no longer reduced, turning off the ninth stop valve, turning on the eighth stop valve, and turning on the vacuum pump to vacuumize the pipeline and the core specimen, and when the reading of the pressure sensor is stable, turning off the eighth stop valve and the vacuum pump in sequence; turning off the fifth stop valve, the sixth stop valve and the seventh stop valve, turning on the fourth stop valve, turning on the inert gas pressure reducing valve, then introducing the inert gas in a certain pressure, and then turning off the fourth stop valve and the inert gas pressure reducing valve; and recording the stabilized reading of the first pressure sensor as $P_1$;

turning on the sixth stop valve to allow the inert gas in the gas pipeline to enter the calibration tank, and after the reading of the first pressure sensor is stabilized again, recording the pressure at the moment as $P_2$; and at the moment, obtaining a formula (I) for calculating the free space volume of the gas pipeline according to the gas state equation and the Boyle's law;

$$p_1 V_1 = p_2 (V_R + V_1) \qquad (I)$$

turning on the inert gas pressure reducing valve and the fourth stop valve, then continuously introducing the inert gas in a certain amount, then turning off the fourth stop valve and the inert gas pressure reducing valve, and then after the reading of the first pressure sensor is stable, recording the pressure at the moment as $P_3$; turning on the fifth stop valve, and after the reading of the first pressure sensor is stable, recording the pressure at the moment as $P_4$; and at the moment, obtaining a formula (II) for calculating the free space volume of the gas pipeline according to the gas state equation and the Boyle's law;

$$p_3 (V_R + V_1) = p_4 (V_R + V_1 + V_2) \qquad (II)$$

turning on the seventh stop valve, and when the reading of the second pressure sensor and the reading of the first pressure sensor are the same, recording the pressure at the moment as $P_5$; after the reading of the second pressure sensor and the reading of the first pressure sensor are stable and no longer reduced, recording the pressure at the moment as $P_6$; and at the moment, obtaining a formula (III) and a formula (IV) for calculating the free space volume of the gas pipeline according to the gas state equation and the Boyle's law:

$$p_4 (V_R + V_1 + V_2) = p_5 (V_R + V_1 + V_2 + V_3) \qquad (III)$$

$$p_4 (V_R + V_1 + V_2) = p_6 (V_R + V_1 + V_2 + V_3 V_P) \qquad (IV)$$

wherein $V_R$ represents a free space volume of the calibration tank and a free space volume of the connected gas pipeline between the calibration tank and the sixth stop valve, and the free space volume of the connected gas pipeline is obtained according to an internal diameter and a length of the gas pipeline; $V_1$ represents a free space volume of the connected gas pipelines between the second stop valve, the third stop valve, the fourth stop valve, the fifth stop valve and the sixth stop valve, including a volume of the connected gas pipeline between the first pressure sensor and the gas inlet pipeline; $V_2$ represents a free space volume of the connected gas pipelines between the inlet end of the core specimen and the fifth stop valve, and between the inlet end of the core specimen and the seventh stop valve; $V_3$ represents a free space volume of the connected gas pipelines between the gas outlet end of the core specimen and the seventh stop valve, between the gas outlet end of the core specimen and the eighth stop valve, and between the gas outlet end of the core specimen and the ninth stop valve, including a free space volume of the connected gas pipeline between the second pressure sensor and the gas outlet pipeline and a free space volume of the downstream buffer chamber; and $V_P$ represents a free space volume inside the core specimen; and obtaining the free space volumes $V_1$, $V_2$, $V_3$ and $V_P$ by calculating through formulas (I), (II), (III) and (IV);

S4. vacuumizing: after the operation of S3 is completed, turning on the ninth stop valve to exhaust the gas in the gas pipeline and the core specimen; after the reading of the second pressure sensor and the reading of the first pressure sensor are no longer reduced significantly, turning off the ninth stop valve, turning on the first stop valve, the second stop valve, the third stop valve and the sixth stop valve, and turning on the vacuum pump to vacuumize the gas pipeline and the core specimen for 2 hours; and when the reading of the second pressure sensor and the reading of the first pressure sensor are no longer reduced, turning off the first stop valve, the second stop valve, the third stop valve, the sixth stop valve, the seventh stop valve, the eighth stop valve and the vacuum pump in sequence;

S5. pre-adsorbing and saturating $CH_4$: adjusting the $CH_4$ gas pressure reducing valve, pressurizing the $CH_4$ gas to the set adsorption pressure through the hydraulic pump and the second piston, then turning on the third stop valve, introducing the $CH_4$ into the core specimen, and monitoring a $CH_4$ injection rate $v_{CH4}$ in real time by using the first flowmeter;

when the reading of the first pressure sensor reaches the set adsorption pressure, turning off the $CH_4$ gas pressure reducing valve, the third stop valve and the hydraulic pump, and recording a gas injection time as $t_1$; and standing still for 2 hours, when the reading of the first pressure sensor is equal to the reading of the second pressure sensor and remains stable, considering that the $CH_4$ gas has been adsorbed to be saturated in the core specimen, recording the temperature at the moment as T and the pressure at the moment as $P_{11}$, and then obtaining the following according to the ideal gas state equation:

$$\begin{cases} Q_{CH_4} = \int_0^{t_1} v_{CH_4} dt \\ Q_{CH_4-free} = \dfrac{p_{11}(V_1 + V_2 + V_3)}{Z_{CH_4-11}RT} V_m \\ Q_{CH_4-storage} = Q_{CH_4} - Q_{CH_4-free} \end{cases} \quad (V)$$

wherein $Z_{CH4-11}$ represents a compressibility coefficient of the $CH_4$ gas under the pressure $P_{11}$ directly obtained according to the corresponding relationship diagram between the compressibility coefficient of $CH_4$ and the pressure; R represents a molar gas constant; $V_m$ represents a molar volume of gas; $Q_{CH4}$ represents a total amount of the introduced $CH_4$ gas; $Q_{CH4-free}$ represents an amount of the $CH_4$ gas in an ionized state in the free space of the gas pipeline; $Q_{CH4-storage}$ represents an amount of the $CH_4$ gas in a adsorption form or an ionized form stored in the core specimen;

S6. pulsed displacing and replacing $CH_4$ with $CO_2$: presetting the hydraulic pump to pressurize the $CO_2$ gas to the pulsed peak pressure under a coaction of the hydraulic pump and the first piston;

setting the pulse generator to allow the $CO_2$ gas passing through the pulse solenoid valve to form a pulsed pressure in a certain amplitude, frequency and waveform;

turning on the hydraulic pump, the $CO_2$ gas pressure reducing valve, the pulse generator, the first stop valve, the second stop valve, the ninth stop valve and the gas chromatograph in sequence, then allowing the $CO_2$ pulsed gas to pass through the upstream buffer chamber, the second stop valve, the first flowmeter and the fifth stop valve in sequence, then to reach at the core specimen, and then to displace and replace the $CH_4$ gas inside the core specimen, then allowing the mixed gas to pass through the downstream buffer chamber, the back pressure valve, the ninth stop valve and the second flowmeter, and then to reach at the gas chromatograph, then analyzing the component and the amount of the mixed gas by the gas chromatograph, and then exhausting the mixed gas to the tail gas recovery tank;

during the displacement process, monitoring a $CO_2$ gas injection rate $v_{CO2}$ and a mixed gas exhaust rate $v_{mixed}$ respectively by using the first flowmeter and the second flowmeter, analyzing a $CO_2$ gas amount $\varphi_{CO2}$ in the mixed gas in real time by using the gas chromatograph, and transmitting the monitoring results to the data acquisition terminal in real time;

after a time $t_i$ from the beginning of the displacement experiment, wherein i=0, 1, 2, . . . N, N is a positive integer; and $t_i$ represents a time, and time intervals between adjacent time are equal, and when the time is $t_i$ and the reading of the second pressure sensor is $P_i$, obtaining a total amount of $CH_4$ in the recovered gas as $Q_{CH4-recovery (i)}$ and a total amount of $CH_4$ in the ionized state in the free space of the gas pipeline at time $t_i$ as $Q_{CH4-free (i)}$, and obtaining the following according to the ideal gas state equation:

$$\begin{cases} Q_{CH_4-recovery(i)} = \int_0^{t_i} v_{mixed}(1 - \varphi_{CO_2}) dt \\ Q_{CH_4-free(i)} = \dfrac{p_i V_3}{Z_{CO_2-i}RT} V_m \cdot (1 - \varphi_{CO_2(i)}) \\ Q_{CH_4-replace(i)} = Q_{CH_4-recovery(i)} - (Q_{CH_4-free} - Q_{CH_4-free(i)}) \\ R_{CH_4-storage(i)} = \dfrac{Q_{CH_4-replace(i)}}{Q_{CH_4-storage}} \times 100\% \end{cases} \quad (VI)$$

wherein $Z_{CO2-i}$ represents a compressibility coefficient of the $CO_2$ gas under the pressure $P_i$ directly obtained according to the corresponding relationship diagram between the compressibility coefficient of $CH_4$ and the pressure; $\varphi_{CO2(i)}$ represents a total amount of $CO_2$ in the mixed gas obtained by the gas chromatograph at time $t_i$; $Q_{CH4\text{-}replace\ (i)}$ represents a total recovery capacity of $CH_4$ stored in the core specimen at time $t_i$; and $R_{CH4\text{-}storage\ (i)}$ represents a real-time recovery rate of the stored $CH_4$ at time $t_i$; and when the exhaust gas is unable to monitor $CH_4$, considering that the pulsed displacement and replacement of $CH_4$ with $CO_2$ under the setting conditions is finished, turning off the first stop valve, the second stop valve, the ninth stop valve, the $CO_2$ gas pressure reducing valve and the hydraulic pump, recording the displacement time as $t_N$, then when the reading of the first pressure sensor is equal to the reading of the second pressure sensor and remains stable, recording the pressure as $P_N$; and then obtaining a final recovery rate of the stored $CH_4$ as $R_{CH4\text{-}storage\text{-}final}$ from the formula (VI);

S7. calculating the displacement evaluation indicator after the displacement is finished: after the displacement is finished, obtaining a total amount of the introduced $CO_2$ as $Q_{CO2}$, an amount of $CO_2$ in the recovered gas as $Q_{CO2\text{-}recovery}$, and an amount of $CO_2$ in the free space of the gas pipeline as $Q_{CO2\text{-}free}$, then obtaining an amount of $CO_2$ stored in the core specimen as $Q_{CO2\text{-}storage}$, and then obtaining a formula (VII) according to the ideal gas state equation:

$$\begin{cases} Q_{CO_2} = \int_0^{t_N} v_{CO_2} dt \\ Q_{CO_2\text{-}recovery} = \int_0^{t_N} v_{mixed}\varphi_{CO_2} dt \\ Q_{CO_2\text{-}free} = \frac{p_N(V_1 + V_2 + V_3)}{Z_{CO_2\text{-}N}RT}V_m \\ Q_{CO_2\text{-}storage} = Q_{CO_2} - Q_{CO_2\text{-}recovery} - Q_{CO_2\text{-}free} \end{cases} \quad \text{(VII)}$$

wherein $Z_{CO2\text{-}N}$ represents a compressibility coefficient of the $CO_2$ gas under the pressure $P_N$ directly obtained according to the corresponding relationship diagram between the compressibility coefficient of $CH_4$ and the pressure; $Q_{CO2}$ represents a total amount of the introduced $CO_2$; $Q_{CO2\text{-}recovery}$ represents a total amount of $CO_2$ in the recovered gas; $Q_{CO2\text{-}free}$ represents a total amount of $CO_2$ in the free space of the gas pipeline; and $Q_{CO2\text{-}storage}$ represents a total storage capacity of $CO_2$ stored in the core specimen; and when the time is $t_N$, i.e. the displacement is finished, obtaining a total recovery capacity of $CH_4$ stored in the core specimen as $Q_{CH4\text{-}replace}$ from the formula (VI), and obtaining a displacement and replacement ratio $\beta$:

$$\beta = \frac{Q_{CO_2\text{-}storage}}{Q_{CH_4\text{-}replace}} \quad \text{(VIII)}$$

wherein $Q_{CO2\text{-}storage}$ represents the total storage capacity of $CO_2$; and $Q_{CH4\text{-}replace}$ represents the total recovery capacity of the stored $CH_4$; and S8. changing the conditions for the next group of experiments: after the above steps are completed, changing the pulse parameters and environmental conditions according to the experimental design scheme, repeating steps S1-S7, thereby simulating the effect of the pulsed displacement and replacement of $CH_4$ with $CO_2$ under the different pulse parameters and environmental conditions, and determining the $CO_2$ pulsed pressure parameter for the different reservoir environments, thereby improving the $CH_4$ recovery rate and the exploitation efficiency.

The beneficial effects of the disclosure are as follows:

1) The disclosure provides the experimental system for the pulsed displacement and replacement of $CH_4$ with $CO_2$, through arranging the gas supply system, the pulse control system, the reservoir environment simulation system, the data acquisition and processing system and a tail gas recovery system connected in sequence, the $CO_2$ gas output from the gas supply system is converted into the pulsed gas in a non-steady state through the pulse control system, the pulsed gas enters the reservoir environment simulation system to shorten the time of displacing and replacing $CH_4$ with $CO_2$ and to improve the efficiency of displacing and replacing $CH_4$ with $CO_2$ and the recovery rate of $CH_4$, and meanwhile, the experimental data of the reservoir environment simulation system is recorded in real time, analyzed and processed by the data acquisition and processing system, and the dynamic displacement process is reflected in real time, thereby accurately obtaining the relationship between the displacement evaluation indicator and the displacement time. The disclosure solves the problem that the existing devices for the displacement and replacement of $CH_4$ with $CO_2$ have the long displacement and replacement time, and cannot reflect the dynamic displacement process in real time, leading to the failure to clarify the relationship between the displacement evaluation indicator and displacement time.

2) The disclosure provides the experimental evaluation method for the displacement and replacement of $CH_4$ with $CO_2$ gas, through the displacement process, the data acquisition and processing system and sensor elements are used to monitor the changes of the gas flow, the pressure, the temperature and the component and the amount of the exhaust gas in real time, and the data processing software is used to realize the real-time calculation of $CH_4$ recovery rate during the dynamic displacement process, and after the displacement is completed, the displacement and replacement ratio, the $CO_2$ storage capacity and other indicators are analyzed, wherein on one hand, a refine experimental evaluation method is established for the effect of the pulsed displacement and replacement of $CH_4$ with $CO_2$, and on the other hand, through the pulsed displacement and replacement of $CH_4$ with $CO_2$, the exploitation efficiency and the recovery rate of $CH_4$ are improved, the beneficial reference value is provided for the actual unconventional natural gas exploitation, and there is the promotion and application value in the technical field of natural gas exploitation.

DESCRIPTION OF THE EMBODIMENTS

Figure 1:
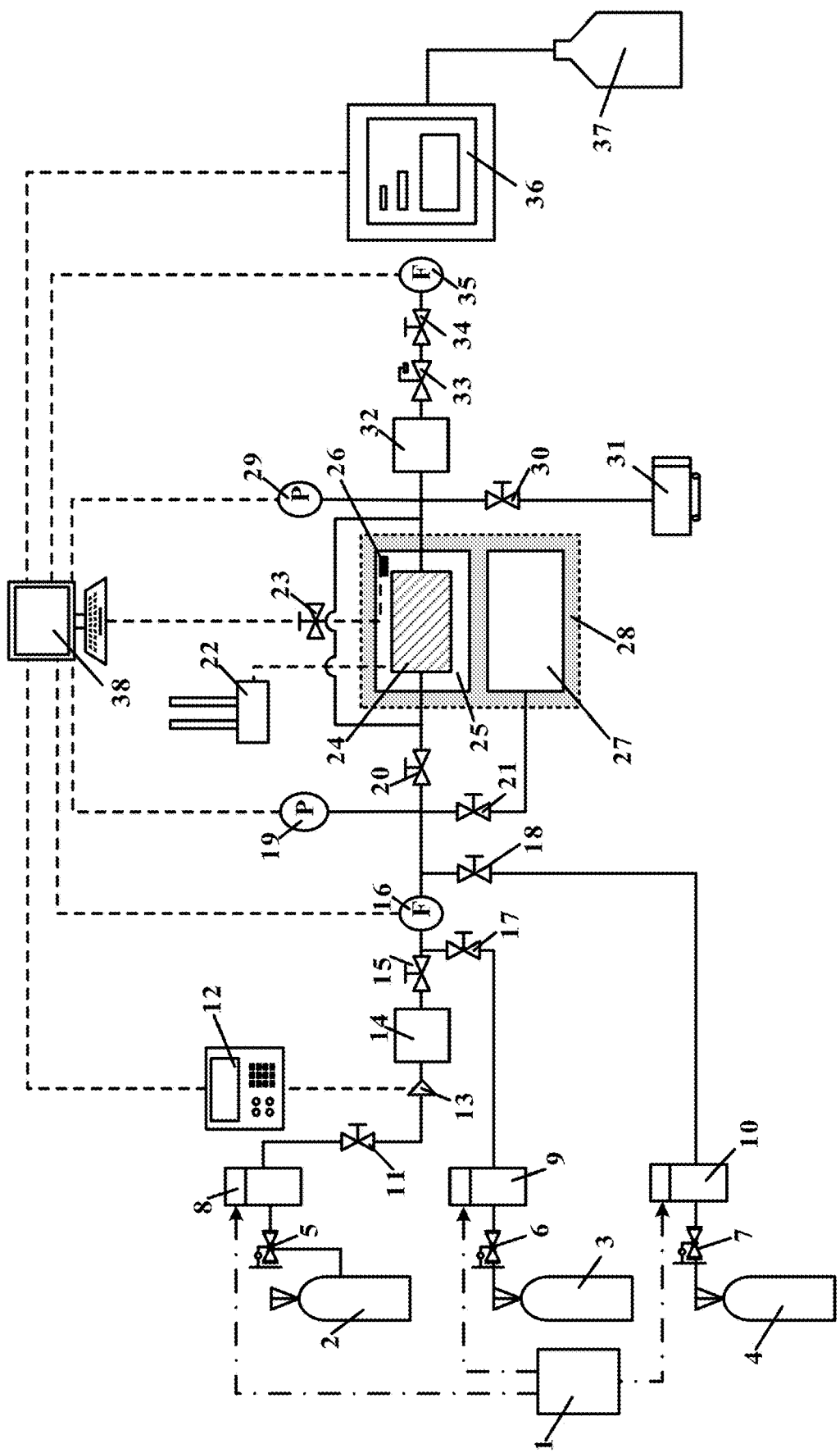
FIG. 1 is a structural diagram of an experimental system for a pulsed displacement and replacement of $CH_4$ with $CO_2$ of the disclosure.

The embodiments of the disclosure are described below with reference to the drawings and the preferred embodiments. Those skilled in the art can easily understand the other advantages and effects of the disclosure from the contents disclosed in the specification. The disclosure can also be implemented or applied by other different specific embodiments, and various details in the specification can also be modified or changed based on different perspectives and applications without departing from the spirit of the disclosure. It should be understood that the preferred embodiments are only for illustrating the disclosure and are not for limiting the scope of the protection of the disclosure.

It should be noted that the drawing provided in the following embodiments only illustrates the basic concept of the disclosure in the schematic representation, so only the components related to the disclosure rather than the number, the shape and the size of the components according to the actual implementation are shown in the drawing. The type, the number and the proportion of each component in the actual implementation can be optionally changed, and the arrangement type of the component can be more complex.

Embodiment 1

As shown in FIG. 1, an experimental system for a pulsed displacement and replacement of $CH_4$ with $CO_2$ includes the gas supply system, the pulse control system, the reservoir environment simulation system, the data acquisition and processing system and the tail gas recovery system which are connected in sequence;

the gas supply system provides the gas source for the reservoir environment simulation system, and the gas source includes $CO_2$, $CH_4$ and the inert gas;

the pulse control system provides the pulse for the gas source to convert the gas passing through the pulse control system into the pulsed gas;

the reservoir environment simulation system simulates the temperature environment and the pressure environment of the different reservoirs;

the data acquisition and processing system records in real time, analyzes and processes the experimental data of the reservoir environment simulation system;

the tail gas recovery system recovers and processes the tail gas of the reservoir environment simulation system;

the $CO_2$ gas output from the gas supply system is converted into the pulsed gas by passing through the pulse control system, the pulsed gas enters the reservoir environment simulation system to shorten the time of displacing and replacing $CH_4$ with $CO_2$ gas, the experimental data of the reservoir environment simulation system is recorded in real time, analyzed and processed by using the data acquisition and processing system, the dynamic displacement process is reflected in real time, and the relationship between the displacement evaluation indicator and the displacement time is clarified.

Through arranging the gas supply system, the pulse control system, the reservoir environment simulation system, the data acquisition and processing system and the tail gas recovery system connected in sequence, the $CO_2$ gas output from the gas supply system is converted into the pulsed gas in the non-steady state through the pulse control system, the pulsed gas enters the reservoir environment simulation system to shorten the time of displacing and replacing $CH_4$ with $CO_2$ and to improve the efficiency of displacing and replacing $CH_4$ with $CO_2$ and the recovery rate of $CH_4$, and meanwhile, the experimental data of the reservoir environment simulation system is recorded in real time, analyzed and processed by the data acquisition and processing system, the dynamic displacement process is reflected in real time, thereby accurately obtaining the relationship between the displacement evaluation indicator and the displacement time. The disclosure solves the problem that the existing devices for the displacement and replacement of $CH_4$ with $CO_2$ have the long displacement and replacement time, and cannot reflect the dynamic displacement process in real time, leading to the failure to clarify the relationship between the displacement evaluation indicator and the displacement time.

In this embodiment, the inert gas includes helium (He), neon (Ne), argon (Ar), etc.

In this embodiment, the principle of the generation of the pulsed gas is: in different experimental stages, through arranging the pulse generator, the gas after passing through the pulse solenoid valve can be converted into the pulsed gas in the certain pulse parameters at the outlet; meanwhile, the data acquisition terminal is connected with the pulse generator to feed back the pressure data in real time and to monitor the pulse process; and in addition, the pulse generator can be set in different amplitude, frequency and pressure of the pulse to convert the gas into the pulsed gas in different pulse parameters.

Wherein, the inside of the data acquisition and processing system is equipped with a sensor recording module and a data processing unit, which can record the changes of the gas flow, the pressure, the temperature and other data during the experimental process in real time, and can realize the calculation of the displacement and replacement evaluation indicator during the dynamic displacement process and after the displacement is completed.

The gas supply system comprises the $CO_2$ supply system, the $CH_4$ supply system and the inert gas supply system which are connected in parallel with each other through the gas pipelines;

the $CO_2$ supply system and the $CH_4$ supply system are connected in parallel, then connected with the first flowmeter 16, then further connected in parallel with the inert gas supply system, and then connected with the reservoir environment simulation system.

The $CO_2$ supply system comprises the $CO_2$ cylinder 2, the $CO_2$ gas pressure reducing valve 5, the first piston 8 and the second stop valve 15 which are connected in sequence;

the CH$_4$ supply system comprises the CH$_4$ cylinder 3, the CH$_4$ gas pressure reducing valve 6, the second piston 9 and the third stop valve 17 which are connected in sequence;

the inert gas supply system comprises the inert gas cylinder 4, the inert gas pressure reducing valve 7, the third piston 10 and the fourth stop valve 18 which are connected in sequence; and the three pistons are all connected with the hydraulic pump 1, the outlet end of the second stop valve 15 and the outlet end of the third stop valve 17 are connected in parallel, and then connected with the inlet end of the first flowmeter 16, and the outlet end of the first flowmeter 16 is connected in parallel with the outlet end of the fourth stop valve 18.

The pulse control system comprises the pulse generator 12, the pulse solenoid valve 13 and the upstream buffer chamber 14 which are connected in sequence;

the pulse solenoid valve 13 and the upstream buffer chamber 14 are connected between the first piston 8 and the second stop valve 15 in the CO$_2$ supply system through the first stop valve 11, and the CO$_2$ gas passing through the pulse solenoid valve 13 is applied the pulse through the pulse generator 12 to shorten the time of displacing and replacing CH$_4$ with CO$_2$, wherein the pulse generator 12 can be set in different amplitude, frequency and pressure of the pulse to convert the gas into the pulsed gas in different pulse parameters; and the pulse generator 12 is connected with the data acquisition and processing system to record in real time and feedback the pulse parameters.

The reservoir environment simulation system comprises the constant temperature water bath device 28, the constant temperature water bath device 28 is provided with the calibration tank 27 and the core holder 25, the inlet end of the calibration tank 27 and the inlet end of the core holder 25 are connected respectively through the fifth stop valve 20 and the sixth stop valve 21 with the gas pipeline after the first flowmeter 16 and the fourth stop valve 18 are connected in parallel, the inlet end of the fifth stop valve 20 and the inlet end of the sixth stop valve 21 are further connected with the first pressure sensor 19, and the outlet end of the core holder 25 is connected with the vacuum pump 31 and the second pressure sensor 29 through the eighth stop valve 30;

the core holder 25 is fixed with the core specimen 24 and the temperature sensor 26;

the seventh stop valve 23 is arranged in parallel between the inlet end and the outlet end of the core holder 25; and the core holder 25 is further connected with the plunger pump 22.

In this embodiment, the core specimen comprises a low permeability and unconventional natural gas reservoir rock such as shale, coal, sandstone, etc.

The pulse control system further includes the downstream buffer chamber 32 and the back pressure valve 33 which are connected in sequence, the inlet end of the downstream buffer chamber 32 is connected with the outlet end of the core holder 25, and the outlet end of the back pressure valve 33 is connected with the ninth stop valve 34 and the second flowmeter 35 in sequence.

The data acquisition and processing system includes the first flowmeter 16, the second flowmeter 35, the first pressure sensor 19, the second pressure sensor 29 and the temperature sensor 26;

the data acquisition and processing system further includes the data acquisition terminal 38, wherein the first flowmeter 16, the second flowmeter 35, the first pressure sensor 19, the second pressure sensor 29 and the temperature sensor 26 are all connected with the data acquisition terminal 38, and the pulse generator 12 is connected with the data acquisition terminal 38.

Wherein, the data acquisition terminal has been equipped with the data processing calculation formula, which can meet the real-time data processing and analysis during the experimental process of the pulsed displacement and replacement of CH$_4$ with CO$_2$.

The tail gas recovery system comprises the gas chromatograph 36 and the tail gas recovery tank 37 which are connected with each other, wherein the inlet end of the gas chromatograph 36 is connected with the outlet end of the second flowmeter 35, and the gas chromatograph 36 is further connected with the data acquisition terminal 38.

Wherein, the gas chromatograph in the tail gas recovery system can analyze the component and the relative amount of the outflow gas in real time, and transmit the data to the data acquisition terminal, thereby achieving the purpose of judging the displacement process.

In order to ensure the airtightness and the corrosion resistance of the pipelines in experiment, all gas pipelines are connected by adopting a stainless steel pipeline in a 316L material, and conical sealing is used between the pipeline and the valve.

Embodiment 2

The experimental evaluation method based on the experimental system for the pulsed displacement and replacement of CH$_4$ with CO$_2$ in embodiment 1, includes the following steps:

S1. setting the initial condition: installing the core specimen in the core holder of the reservoir environment simulation system, turning on the constant temperature water bath device to heat the core specimen to the set temperature, adjusting the plunger pump to allow the pressure around the core specimen to reach the set pressure, turning on the data acquisition terminal, checking whether each sensor and flowmeter works normally, and turning off all the stop valves after the setting is completed;

S2. checking the gas tightness of the device: turning on the fourth stop valve, the fifth stop valve, the sixth stop valve and the seventh stop valve, turning on the inert gas pressure reducing valve, pressurizing the inert gas through the hydraulic pump and the third piston until the pressure is slightly higher than the maximum test pressure, allowing the pressurized inert gas to enter the pipeline, and when the reading of the first pressure sensor and the reading of the second pressure sensor become stable and are equal to the pressurized pressure of the hydraulic pump, turning off the fourth stop valve, the inert gas pressure reducing valve and hydraulic pump in sequence; and standing still for 2 hours; if the reading of the first pressure sensor and the reading of the second pressure sensor are not reduced, considering being good on the gas tightness of the device for carrying out the subsequent operations; otherwise, repeating this step after checking the pipeline connection;

S3. calibrating the free space volume: remaining the on-state and the off-state of the other valves, turning on the ninth stop valve to exhaust the inert gas in the gas pipeline and the core specimen; after the reading of the pressure sensor is no longer reduced, turning off the ninth stop valve, turning on the eighth stop valve, and turning on the vacuum pump to vacuumize the pipeline and the core specimen for 2 hours, and when the reading of the pressure sensor is stable, turning off the eighth stop valve and vacuum pump in sequence; turning off the fifth stop valve, the sixth stop valve and the seventh stop valve, turning on the fourth stop valve, turning on the inert gas pressure reducing valve, then introducing the inert gas in the certain pressure, and then turning off the fourth stop valve and the inert gas pressure reducing valve; and recording the stabilized reading of the first pressure sensor as $P_1$;

turning on the sixth stop valve to allow the inert gas in the gas pipeline to enter the calibration tank, and after the reading of the first pressure sensor is stabilized again, recording the pressure at the moment as $P_2$; and at the moment, obtaining the formula (I) for calculating the free space volume of the gas pipeline according to the gas state equation and the Boyle's law;

$$p_1 V_1 = p_2(V_R + V_1) \tag{I}$$

turning on the inert gas pressure reducing valve and the fourth stop valve, then continuously introducing the inert gas in the certain amount, then turning off the fourth stop valve and the inert gas pressure reducing valve, and the after the reading of the first pressure sensor is stable, recording the pressure at the moment as $P_3$; turning on the fifth stop valve, and after the reading of the first pressure sensor is stable, recording the pressure at the moment as $P_4$; since the flow velocity of the gas in the gas pipeline is much greater than that in the core, considering that when the pressure reaches $P_4$, there is no gas permeating into the core specimen yet; and at the moment, obtaining the formula (II) for calculating the free space volume of the gas pipeline according to the gas state equation and the Boyle's law;

$$p_3(V_R + V_1) = p_4(V_R + V_1 + V_2) \tag{II}$$

turning on the seventh stop valve, and when the reading of the second pressure sensor and the reading of the first pressure sensor are the same, recording the pressure at the moment as $P_5$; and after the reading of the second pressure sensor and the reading of the first pressure sensor are stable and no longer reduced, recording the pressure at the moment as $P_6$. Similarly, it is considered that when the pressure reaches $P_5$, there is no gas permeating into the core specimen yet, and $P_6$ is the pressure where the gas reaches an equilibrium state after passing through the free space volume inside the core specimen, so that $P_6$ is smaller than $P_5$. At the moment, the formula (III) and the formula (IV) for calculating the free space volume of the gas pipeline according to the gas state equation and the Boyle's law are obtained;

$$p_4(V_R + V_1 + V_2) = p_5(V_R + V_1 + V_2 + V_3) \tag{III}$$

$$p_4(V_R + V_1 + V_2) = p_6(V_R + V_1 + V_2 + V_3 V_p) \tag{IV}$$

wherein $V_R$ represents the free space volume of the calibration tank and the connected gas pipeline between the calibration tank and the sixth stop valve, and since the dimension of the calibration tank is designed in advance, the volume of the connected gas pipeline can be obtained according to the internal diameter and the length, so that $V_R$ can be obtained by calculating in advance; $V_1$ represents the free space volume of the connected gas pipelines between the second stop valve, the third stop valve, the fourth stop valve, the fifth stop valve and the sixth stop valve, including the volume of the connected gas pipeline between the first pressure sensor and the gas inlet pipeline; $V_2$ represents the free space volume of the connected gas pipelines between the gas inlet end of the core specimen and the fifth stop valve, and between the gas inlet end of the core specimen and the seventh stop valve; $V_3$ represents the free space volume of the connected gas pipelines between the gas outlet end of the core specimen and the seventh stop valve, between the gas end of the core specimen and the eighth stop valve, and between the outlet end of the core specimen and the ninth stop valve, including the free space volume of the connected gas pipeline between the second pressure sensor and the gas outlet pipeline and the free space volume of the downstream buffer chamber; and $V_P$ represents the free space volume inside the core specimen; and obtaining the free space volumes $V_1$, $V_2$, $V_3$ and $V_P$ by calculating through formulas (I), (II), (III) and (IV), i.e.

$$\begin{cases} V_1 = \dfrac{p_2}{p_1 - p_2} V_R \\ V_2 = \dfrac{p_1(p_3 - p_4)}{p_4(p_1 - p_2)} V_R \\ V_3 = \dfrac{p_1 p_3(p_4 - p_5)}{p_4 p_5(p_1 - p_2)} V_R \\ V_p = \dfrac{p_1 p_3(p_5 - p_6)}{p_5 p_6(p_1 - p_2)} V_R \end{cases} ;$$

S4. vacuumizing: after the operation of S3 is completed, turning on the ninth stop valve to exhaust the gas in the gas pipeline and the core specimen; after the reading of the second pressure sensor and the reading of the first pressure sensor are no longer reduced significantly, turning off the ninth stop valve, turning on the first stop valve, the second stop valve, the third stop valve and the sixth stop valve, and then turning on the vacuum pump to vacuumize the gas pipeline and the core specimen for 2 hours; and when the reading of the second pressure sensor and the reading of the first pressure sensor are no longer reduced, turning off the first stop valve, the second stop valve, the third stop valve, the sixth stop valve, the seventh stop valve, the eighth stop valve and the vacuum pump in sequence;

S5. pre-adsorbing and saturating $CH_4$: adjusting the $CH_4$ pressure reducing valve, pressurizing the $CH_4$ gas to the set adsorption pressure through the hydraulic pump and the second piston, then turning on the third stop valve, introducing $CH_4$ into the core specimen, and monitoring the $CH_4$ injection rate $v_{CH4}$ in real time by using the first flowmeter;

when the reading of the first pressure sensor reaches the set adsorption pressure, turning off the $CH_4$ gas pressure reducing valve, the third stop valve and the hydraulic pump, and recording the gas injection time as $t_1$; and standing still for 2 hours, when the reading of the first pressure sensor is equal to the reading of the second pressure sensor and remains stable, considering that the $CH_4$ gas has been adsorbed to be saturated in the core specimen, recording the temperature at the moment as T and the pressure at the moment as $P_{11}$, and then obtaining the following according to the ideal gas state equation:

$$\begin{cases} Q_{CH_4} = \int_0^{\tau_1} v_{CH_4} dt \\ Q_{CH_4-free} = \dfrac{p_{11}(V_1 + V_2 + V_3)}{Z_{CH_4-11}RT} V_m \\ Q_{CH_4-storage} = Q_{CH_4} - Q_{CH_4-free} \end{cases} \quad (V)$$

wherein $Z_{CH4-11}$ represents the compressibility coefficient of the $CH_4$ gas under the pressure $P_{11}$ directly obtained according to the corresponding relationship diagram between the compressibility coefficient of $CH_4$ and the pressure; R represents the molar gas constant; $V_m$ represents the molar volume of gas; $Q_{CH4}$ represents the total amount of the introduced $CH_4$ gas; $Q_{CH4-free}$ represents the amount of the $CH_4$ gas in the ionized state in the free space of the gas pipeline; $Q_{CH4-storage}$ represents the amount of the $CH_4$ gas in the adsorption form or the ionized form stored in the core specimen;

S6. pulsed displacing and replacing $CH_4$ with $CO_2$: presetting the hydraulic pump to pressurize the $CO_2$ gas to the pulsed peak pressure under the coaction of the hydraulic pump and the first piston;

setting the pulse generator to allow the $CO_2$ gas passing through the pulse solenoid valve to form the pulsed pressure in the certain amplitude, frequency and waveform;

turning on the hydraulic pump, the $CO_2$ gas pressure reducing valve, the pulse generator, the first stop valve, the second stop valve, the ninth stop valve and the gas chromatograph in sequence, then allowing the $CO_2$ pulsed gas to pass through the upstream buffer chamber, the second stop valve, the first flowmeter and the fifth stop valve in sequence, then to reach at the core specimen, and then to displace and replace the $CH_4$ gas inside the core specimen, then allowing the mixed gas to pass through the downstream buffer chamber, the back pressure valve, the ninth stop valve and the second flowmeter, and then to reach at the gas chromatograph, then analyzing the component and the amount of the mixed gas by the gas chromatograph, and then exhausting the mixed gas to the tail gas recovery tank;

during the displacement process, monitoring the $CO_2$ gas injection rate $v_{CO2}$ and the mixed gas exhaust rate $v_{mixed}$ respectively by using the first flowmeter and the second flowmeter, analyzing the $CO_2$ gas amount $\varphi_{CO2}$ in the mixed gas in real time by using the gas chromatograph, and transmitting the monitoring results to the data acquisition terminal in real time;

after the time $t_i$ from the beginning of the displacement experiment, wherein i=0, 1, 2, ... N, N is the positive integer; and $t_i$ represents the time, the time intervals between the adjacent time are equal, and the reading of the second pressure sensor is $P_i$; obtaining the total amount of $CH_4$ in the recovered gas as $Q_{CH4-recovery\ (i)}$ and the total amount of $CH_4$ in the ionized state in the free space of the gas pipeline at time $t_i$ as $Q_{CH4-free\ (i)}$, and obtaining the following according to the ideal gas state equation:

$$\begin{cases} Q_{CH_4-recovery(i)} = \int_0^{t_i} v_{mixed}(1 - \varphi_{CO_2}) dt \\ Q_{CH_4-free(i)} = \dfrac{p_i V_3}{Z_{CO_2-i}RT} V_m \cdot (1 - \varphi_{CO_2(i)}) \\ Q_{CH_4-replace(i)} = Q_{CH_4-recovery(i)} - (Q_{CH_4-free} - Q_{CH_4-free(i)}) \\ R_{CH_4-storage(i)} = \dfrac{Q_{CH_4-replace(i)}}{Q_{CH_4-storage}} \times 100\% \end{cases} \quad (VI)$$

wherein $Z_{CO2-i}$ represents the compressibility coefficient of the $CO_2$ gas under the pressure $P_i$ directly obtained according to the corresponding relationship diagram between the compressibility coefficient of $CH_4$ and the pressure; $\varphi_{CO2(i)}$ represents the total amount of $CO_2$ in the mixed gas obtained by the gas chromatograph at time $t_i$; $Q_{CH4-replace\ (i)}$ represents the total recovery capacity of $CH_4$ stored in the core specimen at time $t_i$; and $R_{CH4-storage\ (i)}$ represents the real-time recovery rate of the stored $CH_4$ at time $t_i$; and when the exhaust gas is unable to monitor $CH_4$, considering that the pulsed displacement and replacement of $CH_4$ with $CO_2$ under the setting conditions is finished, turning off the first stop valve, the second stop valve, the ninth stop valve, the $CO_2$ gas pressure reducing valve and the hydraulic pump, recording the displacement time as $t_N$, then when the reading of the first pressure sensor is equal to the reading of the second pressure sensor and remains stable, recording the pressure as $P_N$; and obtaining the final recovery rate of the stored $CH_4$ as $R_{CH4-storage-final}$ from the formula (VI);

wherein in S6, when the pulse generator is set to a gas direct passing mode, i.e. the pulse processing is not carried out on the $CO_2$ gas, the experimental evaluation method can realize the purpose of the steady state displacement of $CH_4$ by $CO_2$, and obtain the real-time recovery rate of the stored $CH_4$ in the steady state displacement process in real time;

S7. calculating the displacement evaluation indicator after the displacement is finished: after the displacement is finished, obtaining the following:

$$\begin{cases} Q_{CO_2} = \int_0^{t_N} v_{CO_2} dt \\ Q_{CO_2-recovery} = \int_0^{t_N} v_{mixed} \varphi_{CO_2} dt \\ Q_{CO_2-free} = \dfrac{p_N(V_1 + V_2 + V_3)}{Z_{CO_2-N}RT} V_m \\ Q_{CO_2-storage} = Q_{CO_2} - Q_{CO_2-recovery} - Q_{CO_2-free} \end{cases} \quad (VII)$$

wherein $Z_{CO2-N}$ represents the compressibility coefficient of the $CO_2$ gas under the pressure $P_N$ directly obtained according to the corresponding relationship diagram between the compressibility coefficient of $CH_4$ and the pressure; $Q_{CO2}$ represents the total amount of the introduced $CO_2$; $Q_{CO2-recovery}$ represents the total amount of $CO_2$ in the recovered gas; $Q_{CO2-free}$ represents the total amount of $CO_2$ in the free space of the gas pipeline; and $Q_{CO2-storage}$ represents the total amount of $CO_2$ stored in the core specimen; and when the time is $t_N$, i.e. the displacement is finished, obtaining the total recovery capacity of $CH_4$ stored in the core specimen as $Q_{CH4\text{-}replace}$ from the formula (VI), and obtaining the displacement and replacement ratio $\beta$:

$$\beta = \frac{Q_{CO_2\text{-}storage}}{Q_{CH_4\text{-}replace}} \qquad (VIII)$$

wherein $Q_{CO2\text{-}storage}$ represents the total storage capacity of $CO_2$; and $Q_{CH4\text{-}replace}$ represents the total recovery capacity of the stored $CH_4$; and S8. changing the conditions for the next group of experiments: after the above steps are completed, changing the pulse parameters (amplitude, frequency and waveform) and environmental conditions (including temperature and pressure) according to the experimental design scheme, repeating steps S1-S7, thereby simulating the effect of the pulsed displacement and replacement of $CH_4$ with $CO_2$ under the different pulse parameters and environmental conditions, and determining the optimal $CO_2$ pulsed pressure parameter for the different reservoir environments, thereby improving the $CH_4$ recovery rate and the exploitation efficiency.

Figure 2:
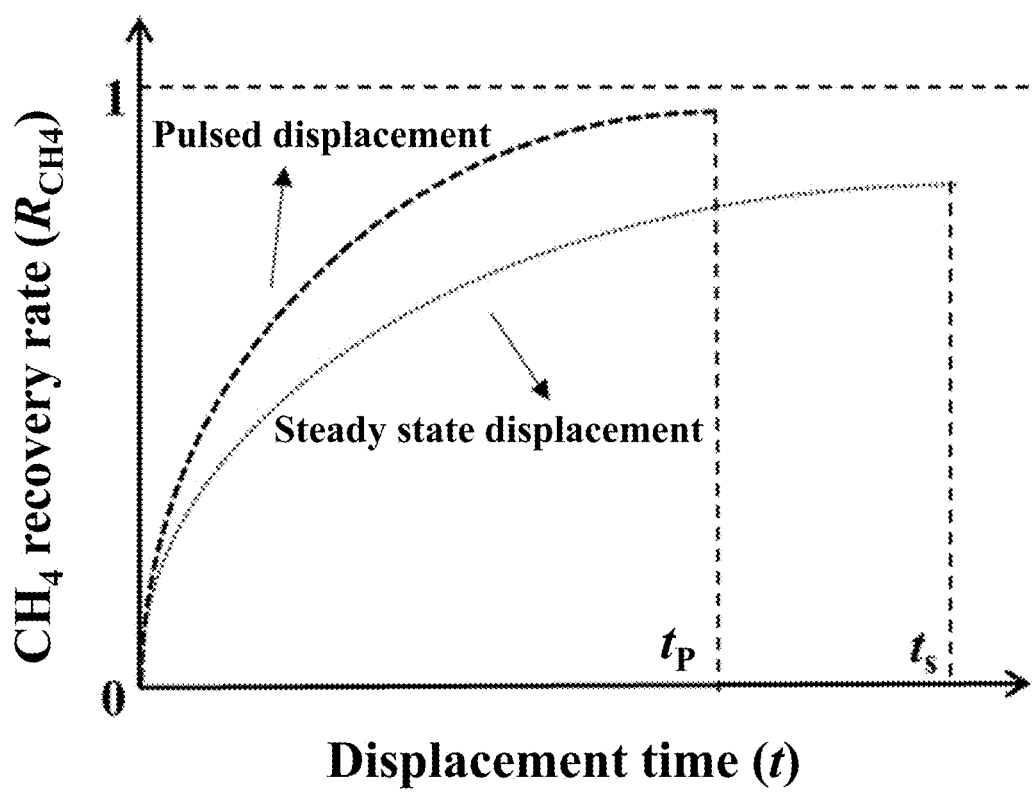
FIG. 2 is a comparison diagram between a real-time recovery rate of stored $CH_4$ during a pulsed $CO_2$ gas displacement process and a real-time recovery rate of stored $CH_4$ during a steady state displacement process, wherein 1—the hydraulic pump; 2—the $CO_2$ cylinder; 3—the $CH_4$ cylinder; 4—the inert gas cylinder; 5—the $CO_2$ gas pressure reducing valve; 6—the $CH_4$ gas pressure reducing valve; 7—the inert gas pressure reducing valve; 8—the first piston; 9—the second piston; 10—the third piston; 11—the first stop valve; 12—the pulse generator; 13—the pulse solenoid valve; 14—the upstream buffer chamber; 15—the second stop valve; 16—the first flowmeter; 17—the third stop valve; 18—the fourth stop valve; 19—the first pressure sensor; 20—the fifth stop valve; 21—the sixth stop valve; 22—the plunger pump; 23—the seventh stop valve; 24—the core specimen; 25—the core holder; 26—the temperature sensor; 27—the calibration tank; 28—the constant temperature water bath device; 29—the second pressure sensor; 30—the eighth stop valve; 31—the vacuum pump; 32—the downstream buffer chamber; 33—the back pressure valve; 34—the ninth stop valve; 35—the second flowmeter; 36—the gas chromatograph; 37—the tail gas recovery tank; and 38—the data acquisition terminal.

In FIG. 2, it is shown that the comparison diagram between the real-time recovery rate of the stored $CH_4$ during the non-steady state (i.e. pulsed $CO_2$ gas) displacement process and the real-time recovery rate of the stored $CH_4$ during the steady state displacement process, wherein $R_{CH4=1}$ represents that the recovery rate is 100%, $t_s$ represents a time when the displacement is finished in the steady process, and $t_p$ represents a time when the displacement is finished in the non-steady state process. As illustrated in the comparison analysis of FIG. 2, at the same time, the real-time recovery rate of the stored $CH_4$ in the pulsed $CO_2$ gas displacement process is significantly greater than the real-time recovery rate of the stored $CH_4$ in the steady state displacement process. Therefore, it proves that the displacement of $CH_4$ by pulsed $CO_2$ gas is used to improve the recovery rate ($R_{CH4}$) of $CH_4$ stored in the reservoir.

In embodiment 2, the formula has been equipped with the data acquisition terminal in advance. Along with the experimental process of the pulsed displacement of $CH_4$ by $CO_2$ gas, the relationship between the real-time recovery rate $R_{CH4\text{-}storage\ (i)}$ of the stored $CH_4$ and the displacement time can be directly obtained from the experimental data, and the final recovery rate $R_{CH4\text{-}storage\text{-}final}$ of the store $CH_4$, the $CO_2$ amount $Q_{CO2\text{-}storage}$, the displacement and replacement ratio $\beta$ and the other displacement evaluation indicator can be obtained. Compared with the steady state displacement process, the analysis shows that the pulsed displacement and replacement of $CH_4$ with $CO_2$ have the advantages of short displacement time, high $CH_4$ recovery rate and better displacement effect.

In summary, the disclosure provides the experimental system for the pulsed displacement and replacement of $CH_4$ with $CO_2$, through arranging the gas supply system, the pulse control system, the reservoir environment simulation system, the data acquisition and processing system and a tail gas recovery system which are connected in sequence, the $CO_2$ gas output from the gas supply system is converted into the pulsed gas in the non-steady state through the pulse control system, the pulsed gas enters the reservoir environment simulation system to shorten the time of displacing and replacing $CH_4$ with $CO_2$ and to improve the efficiency of displacing and replacing $CH_4$ with $CO_2$ and the recovery rate of $CH_4$, and meanwhile, the experimental data of the reservoir environment simulation system is recorded in real time, analyzed and processed by the data acquisition and processing system, and the dynamic displacement process is reflected in real time, thereby accurately obtaining the relationship between the displacement evaluation indicator and the displacement time. The disclosure solves the problem that the existing devices for the displacement and replacement of $CH_4$ with $CO_2$ gas have the long displacement and replacement time, and cannot reflect the dynamic displacement process in real time, leading to the failure to clarify the relationship between the displacement evaluation indicator and displacement time.

The disclosure provides the experimental evaluation method for the displacement and replacement of $CH_4$ with $CO_2$ gas, through the displacement process, the data acquisition and processing system and sensor elements are used to monitor the changes of the gas flow, the pressure, the temperature and the component and the amount of the exhaust gas in real time, and the data processing software is used to realize the real-time calculation of $CH_4$ recovery rate during the dynamic displacement process, and after the displacement is completed, the displacement and replacement ratio, the $CO_2$ storage capacity and other indicators are analyzed, wherein on one hand, a refine experimental evaluation method is established for the effect of the pulsed displacement and replacement of $CH_4$ with $CO_2$, and on the other hand, through pulsed displacing and replacing $CH_4$ with $CO_2$, the exploitation efficiency and the $CH_4$ recovery rate are improved, the beneficial reference value is provided for the actual unconventional natural gas exploitation, and there is the promotion and application value in the technical field of natural gas exploitation.

The above embodiments are merely preferred embodiments for fully illustrating the present disclosure, and the scope of the protection of the disclosure is not limited thereto. The equivalent substitution or change on the basis of the disclosure made by the person skilled in the art are all within the scope of the protection of the disclosure.

What is claimed is:

1. An experimental evaluation method for a pulsed displacement and replacement of methane with carbon dioxide, comprising an experimental system for the pulsed displacement and replacement of methane with carbon dioxide, the experimental system comprising a gas supply system, a pulse control system, a reservoir environment simulation system, a data acquisition and processing system and a tail gas recovery system which are connected in sequence;

the gas supply system configured to provide a gas source for the reservoir environment simulation system, the gas source comprising carbon dioxide, methane and an inert gas;

the pulse control system configured to provide a pulse for the gas source to convert a gas passing through the pulse control system into a pulsed gas;

the reservoir environment simulation system configured to simulate a temperature environment and a pressure environment of different reservoirs;

the data acquisition and processing system configured to record in real time, analyze and process an experimental data of the reservoir environment simulation system; and the tail gas recovery system configured to recover and process a tail gas of the reservoir environment simulation system, wherein the carbon dioxide gas output from the gas supply system is converted into the pulsed gas by passing through the pulse control system, the pulsed gas enters the reservoir environment simulation system to shorten a time of displacing and replacing methane with the carbon dioxide gas, the experimental data of the reservoir environment simulation system is recorded in real time, analyzed and processed by the data acquisition and processing system, a dynamic displacement process is reflected in real time, and a relationship between a displacement evaluation indicator and a displacement time is clarified, the experimental evaluation method comprising the follow steps:

S1. setting an initial condition: installing the core specimen in the reservoir environment simulation system, adjusting a temperature and a pressure around the core specimen to reach a set value, turning on a data acquisition terminal in the data acquisition and processing system, checking whether each instrument works normally, and turning off all stop valves after the setting is completed;

S2. checking a gas tightness of a device: turning on the inert gas in the gas supply system, pressurizing the inert gas until a pressure is higher than a maximum test pressure, allowing the pressurized inert gas to enter a pipeline, and when the pressure becomes stable and is equal to the pressurized pressure, turning off a valve; and standing still, if the pressure is not reduced, carrying out subsequent operations;

S3. calibrating a free space volume: exhausting the inert gas in the pipeline and the core specimen; after the pressure is no longer reduced, vacuumizing the pipeline and the core specimen, and when the pressure is stable, turning off the valve; turning on an inert gas pipeline, then introducing the inert gas, and then turning off the valve on the inert gas pipeline; and recording the stabilized pressure;

allowing the inert gas in the gas pipeline to enter a calibration tank of the reservoir environment simulation system, and after the pressure is stabilized again, recording the pressure at a moment when the pressure is stabilized; and obtaining a first formula for calculating the free space volume of the gas pipeline according to a gas state equation and Boyle's law;

after the inert gas is continuously introduced, turning off the valve on the inert gas pipeline, and after the pressure is stable, recording the pressure at the moment; turning on a valve of a gas inlet of the core specimen, and after the pressure is stable, recording the pressure at the moment; and obtaining a second formula for calculating the free space volume of the gas pipeline according to the gas state equation and the Boyle's law;

turning on a valve connected with the gas inlet and a gas outlet of the core specimen, and after the pressure is stable and no longer reduced, recording the pressure at the moment; and obtaining a third formula and a fourth formula for calculating the free space volume of the gas pipeline according to the gas state equation and the Boyle's law; and calculating the free space volumes by the first formula, the second formula, the third formula and the fourth formula;

S4. vacuumizing: after the operation of S3 is completed, exhausting the gas in the gas pipeline and the core specimen; after the pressure is no longer reduced, vacuumizing the gas pipeline and the core specimen; and when the pressure is stable, turning off the valves in sequence;

S5. pre-adsorbing and saturating methane: pressurizing the methane gas to a set adsorption pressure, and then introducing methane into the core specimen; and when the pressure reaches the set adsorption pressure and remains stable, considering that the methane gas has been adsorbed to be saturated in the core specimen;

S6. pulsed displacing and replacing methane with carbon dioxide: pressurizing the carbon dioxide gas to a pulsed peak pressure; and forming the carbon dioxide pulsed gas by passing the carbon dioxide gas through the pulse control system, then allowing the carbon dioxide pulsed gas to reach at the core specimen, and then to displace and replace the methane gas inside the core specimen, then analyzing a component and an amount of the mixed gas, and then exhausting the mixed gas to the tail gas recovery system;

S7. calculating the displacement evaluation indicator after the displacement is finished: after the displacement is finished, obtaining a total storage capacity of carbon dioxide and a total recovery capacity of the stored methane according to the ideal gas state equation, thereby obtaining a displacement and replacement ratio; and S8. changing conditions for the next group of experiments: after the above steps S1-S7 are completed, changing pulse parameters and environmental conditions according to an experimental design scheme, repeating the steps S1-S7 again, thereby simulating an effect of the pulsed displacement and replacement of methane with carbon dioxide under different pulse parameters and environmental conditions, and determining a carbon dioxide pulsed pressure parameter for different reservoir environments, thereby improving a methane recovery rate and an exploitation efficiency.

2. The experimental evaluation method for the pulsed displacement and replacement of methane with carbon dioxide according to claim 1, wherein the gas supply system comprises a carbon dioxide supply system, a methane supply system and an inert gas supply system which are connected in parallel with each other through gas pipelines; and the carbon dioxide supply system and the methane supply system are connected in parallel, then connected with a first flowmeter, then further connected in parallel with the inert gas supply system, and then connected with the reservoir environment simulation system.

3. The experimental evaluation method for the pulsed displacement and replacement of methane with carbon dioxide according to claim 2, wherein the carbon dioxide supply system comprises a carbon dioxide cylinder, a carbon dioxide gas pressure reducing valve, a first piston and a second stop valve which are connected in sequence;

the methane supply system comprises a methane cylinder, a methane gas pressure reducing valve, a second piston and a third stop valve which are connected in sequence;

the inert gas supply system comprises an inert gas cylinder, an inert gas pressure reducing valve, a third piston and a fourth stop valve which are connected in sequence; and the first piston, the second piston and the third piston are all connected with a hydraulic pump, an outlet end of the second stop valve and an outlet end of the third stop valve are connected in parallel, and then connected with an inlet end of the first flowmeter, and an outlet end of the first flowmeter is connected in parallel with an outlet end of the fourth stop valve.

4. The experimental evaluation method for the pulsed displacement and replacement of methane with carbon dioxide according to claim 3, wherein the pulse control system comprises a pulse generator, a pulse solenoid valve and an upstream buffer chamber which are connected in sequence;

the pulse solenoid valve and the upstream buffer chamber are connected between the first piston and the second stop valve in the carbon dioxide supply system through a first stop valve, and the carbon dioxide gas passing through the pulse solenoid valve is applied the pulse through the pulse generator to shorten the time of displacing and replacing methane with carbon dioxide; and the pulse generator is connected with the data acquisition and processing system to record in real time and feedback pulse parameters.

5. The experimental evaluation method for the pulsed displacement and replacement of methane with carbon dioxide according to claim 4, wherein the reservoir environment simulation system comprises a constant temperature water bath device, the constant temperature water bath device is provided with the calibration tank and a core holder, an inlet end of the calibration tank and an inlet end of the core holder are connected respectively through a fifth stop valve and a sixth stop valve with a gas pipeline after the first flowmeter and the fourth stop valve are connected in parallel, the inlet end of the fifth stop valve and the inlet end of the sixth stop valve are further connected with a first pressure sensor, and an outlet end of the core holder is connected with a vacuum pump and a second pressure sensor through a eighth stop valve;

the core holder is fixed with a core specimen and a temperature sensor;

a seventh stop valve is arranged in parallel between the inlet end and the outlet end of the core holder; and the core holder is further connected with a plunger pump.

6. The experimental evaluation method for the pulsed displacement and replacement of methane with carbon dioxide according to claim 5, wherein the pulse control system further comprises a downstream buffer chamber and a back pressure valve which are connected in sequence, an inlet end of the downstream buffer chamber is connected with the outlet end of the core holder, and an outlet end of the back pressure valve is connected with a ninth stop valve and a second flowmeter in sequence.

7. The experimental evaluation method for the pulsed displacement and replacement of methane with carbon dioxide according to claim 6, wherein the data acquisition and processing system comprises the first flowmeter, the second flowmeter, the first pressure sensor, the second pressure sensor and the temperature sensor;

the data acquisition and processing system further comprises the data acquisition terminal, wherein the first flowmeter, the second flowmeter, the first pressure sensor, the second pressure sensor and the temperature sensor are all connected with the data acquisition terminal, and the pulse generator is connected with the data acquisition terminal; and the tail gas recovery system comprises a gas chromatograph and a tail gas recovery tank which are connected with each other, wherein an inlet end of the gas chromatograph is connected with an outlet end of the second flowmeter, and the gas chromatograph is further connected with the data acquisition terminal.

8. The experimental evaluation method according to claim 6, comprising the follow steps:

S1. setting the initial condition: installing the core specimen in the core holder of the reservoir environment simulation system, turning on the constant temperature water bath device to heat the core specimen to the set temperature, adjusting the plunger pump to allow the pressure around the core specimen to reach the set pressure, turning on the data acquisition terminal, checking whether each of sensor and flowmeter of the instrument works normally, and turning off all the stop valves after the setting is completed;

S2. checking the gas tightness of the device: turning on the fourth stop valve, the fifth stop valve, the sixth stop valve and the seventh stop valve, turning on the inert gas pressure reducing valve, pressurizing the inert gas through the hydraulic pump and the third piston until the pressure is higher than the maximum test pressure, allowing the pressurized inert gas to enter the pipeline, and when a reading of the first pressure sensor and a reading of the second pressure sensor become stable and are equal to the pressurized pressure of the hydraulic pump, turning off the fourth stop valve, the inert gas pressure reducing valve and the hydraulic pump in sequence; and standing still, if the reading of the first pressure sensor and the reading of the second pressure sensor are not reduced, considering being good on the gas tightness of the device for carrying out the subsequent operations; otherwise, if at least one of the reading of the first pressure sensor and the reading of the second pressure sensor is reduced, checking a pipeline connection until the reading of the first pressure sensor and the reading of the second pressure sensor are not reduced;

S3. calibrating the free space volume: remaining an on-state and an off-state of other valves, turning on the ninth stop valve to exhaust the inert gas in the gas pipeline and the core specimen; after the reading of the pressure sensor is no longer reduced, turning off the ninth stop valve, turning on the eighth stop valve, and turning on the vacuum pump to vacuumize the pipeline and the core specimen, and when the reading of the pressure sensor is stable, turning off the eighth stop valve and the vacuum pump in sequence; turning off the fifth stop valve, the sixth stop valve and the seventh stop valve, turning on the fourth stop valve, turning on the inert gas pressure reducing valve, then introducing the inert gas in a certain pressure, and then turning off the fourth stop valve and the inert gas pressure reducing valve; and recording the stabilized reading of the first pressure sensor as $P_1$;

turning on the sixth stop valve to allow the inert gas in the gas pipeline to enter the calibration tank, and after the reading of the first pressure sensor is stabilized again, recording the pressure at the moment as $P_2$; and at the moment, obtaining a formula (I) for calculating the free space volume of the gas pipeline according to the gas state equation and the Boyle's law;

$$p_1 V_1 = p_2 (V_R + V_1) \tag{I}$$

turning on the inert gas pressure reducing valve and the fourth stop valve, then continuously introducing the inert gas in a certain amount, then turning off the fourth stop valve and the inert gas pressure reducing valve, and then after the reading of the first pressure sensor is stable, recording the pressure at the moment as $P_3$; turning on the fifth stop valve, and after the reading of the first pressure sensor is stable, recording the pressure at the moment as $P_4$; and at the moment, obtaining a formula (II) for calculating the free space volume of the gas pipeline according to the gas state equation and the Boyle's law;

$$p_3(V_R+V_1)=p_4(V_R+V_1+V_2) \quad \text{(II)}$$

turning on the seventh stop valve, and when the reading of the second pressure sensor and the reading of the first pressure sensor are the same, recording the pressure at the moment as $P_5$; after the reading of the second pressure sensor and the reading of the first pressure sensor are stable and no longer reduced, recording the pressure at the moment as $P_6$; and at the moment, obtaining a formula (III) and a formula (IV) for calculating the free space volume of the gas pipeline according to the gas state equation and the Boyle's law:

$$p_4(V_R+V_1+V_2)=p_5(V_R+V_1+V_2+V_3) \quad \text{(III)}$$

$$p_4(V_R+V_1+V_2)=p_6(V_R+V_1+V_2+V_3+V_P) \quad \text{(IV)}$$

wherein $V_R$ represents a free space volume of the calibration tank and a free space volume of the connected gas pipeline between the calibration tank and the sixth stop valve, and the free space volume of the connected gas pipeline is obtained according to an internal diameter and a length of the gas pipeline; $V_1$ represents a free space volume of the connected gas pipelines between the second stop valve, the third stop valve, the fourth stop valve, the fifth stop valve and the sixth stop valve, including a volume of the connected gas pipeline between the first pressure sensor and the gas inlet pipeline; $V_2$ represents a free space volume of the connected gas pipelines between the inlet end of the core specimen and the fifth stop valve, and between the inlet end of the core specimen and the seventh stop valve; $V_3$ represents a free space volume of the connected gas pipelines between the gas outlet end of the core specimen and the seventh stop valve, between the gas outlet end of the core specimen and the eighth stop valve, and between the gas outlet end of the core specimen and the ninth stop valve, including a free space volume of the connected gas pipeline between the second pressure sensor and the gas outlet pipeline and a free space volume of the downstream buffer chamber; and $V_P$ represents a free space volume inside the core specimen; and obtaining the free space volumes $V_1$, $V_2$, $V_3$ and $V_P$ by calculating through formulas (I), (II), (III) and (IV);

S4. vacuumizing: after the operation of S3 is completed, turning on the ninth stop valve to exhaust the gas in the gas pipeline and the core specimen; after the reading of the second pressure sensor and the reading of the first pressure sensor are no longer reduced, turning off the ninth stop valve, turning on the first stop valve, the second stop valve, the third stop valve and the sixth stop valve, and turning on the vacuum pump to vacuumize the gas pipeline and the core specimen; and when the reading of the second pressure sensor and the reading of the first pressure sensor are no longer reduced, turning off the first stop valve, the second stop valve, the third stop valve, the sixth stop valve, the seventh stop valve, the eighth stop valve and the vacuum pump in sequence;

S5. pre-adsorbing and saturating methane: adjusting the methane gas pressure reducing valve, pressurizing the methane gas to the set adsorption pressure through the hydraulic pump and the second piston, then turning on the third stop valve, introducing methane into the core specimen, and monitoring a methane injection rate $v_{CH_4}$ in real time by using the first flowmeter;

when the reading of the first pressure sensor reaches the set adsorption pressure, turning off the methane gas pressure reducing valve, the third stop valve and the hydraulic pump, and recording a gas injection time as $t_1$; and standing still for 2 hours, when the reading of the first pressure sensor is equal to the reading of the second pressure sensor and remains stable, considering that the methane gas has been adsorbed to be saturated in the core specimen, recording the temperature at the moment as T and the pressure at the moment as $P_{11}$, and then obtaining the following according to the ideal gas state equation:

$$\begin{cases} Q_{CH_4} = \int_0^{t_1} v_{CH_4} dt \\ Q_{CH_4-free} = \dfrac{p_{11}(V_1+V_2+V_3)}{Z_{CH_4-11}RT} V_m \\ Q_{CH_4-storage} = Q_{CH_4} - Q_{CH_4-free} \end{cases} \quad \text{(V)}$$

wherein $Z_{CH_4-11}$ represents a compressibility coefficient of the methane gas under the pressure $P_{11}$ directly obtained according to the corresponding relationship diagram between the compressibility coefficient of methane and the pressure; R represents a molar gas constant; $V_m$ represents a molar volume of gas; $Q_{CH_4}$ represents a total amount of the introduced methane gas; $Q_{CH_4-free}$ represents an amount of the methane gas in an ionized state in the free space of the gas pipeline; $Q_{CH_4-storage}$ represents an amount of the methane gas in a adsorption form or an ionized form stored in the core specimen;

S6. pulsed displacing and replacing methane with carbon dioxide: presetting the hydraulic pump to pressurize the carbon dioxide gas to the pulsed peak pressure under a coaction of the hydraulic pump and the first piston;

setting the pulse generator to allow the carbon dioxide gas passing through the pulse solenoid valve to form a pulsed pressure in a certain amplitude, frequency and waveform;

turning on the hydraulic pump, the carbon dioxide gas pressure reducing valve, the pulse generator, the first stop valve, the second stop valve, the ninth stop valve and the gas chromatograph in sequence to allow the carbon dioxide pulsed gas to pass through the upstream buffer chamber, the second stop valve, the first flowmeter and the fifth stop valve in sequence, then to reach at the core specimen, and then to displace and replace the methane gas inside the core specimen, then allowing the mixed gas to pass through the downstream buffer chamber, the back pressure valve, the ninth stop valve and the second flowmeter, and then to reach at the gas chromatograph, then analyzing the component and the amount of the mixed gas by the gas chromatograph, and then exhausting the mixed gas to the tail gas recovery tank;

during the displacement process, monitoring a carbon dioxide gas injection rate $v_{CO_2}$ and a mixed gas exhaust rate $v_{mixed}$ respectively by using the first flowmeter and the second flowmeter, analyzing a carbon dioxide gas amount $\varphi_{CO_2}$ in the mixed gas in real time by using the gas chromatograph, and transmitting the monitoring results to the data acquisition terminal in real time;

after a time $t_i$ from the beginning of the displacement experiment, wherein i=0, 1, 2, . . . N, N is a positive integer; and $t_i$ represents a time, and time intervals between adjacent time are equal, and when the time is $t_i$ and the reading of the second pressure sensor is $P_i$, obtaining a total amount of methane in the recovered gas as $Q_{CH4\text{-}recovery\ (i)}$ and a total amount of methane in the ionized state in the free space of the gas pipeline at time $t_i$ as $Q_{CH4\text{-}free\ (i)}$, and obtaining the following according to the ideal gas state equation:

$$\begin{cases} Q_{CH_4-recovery(i)} = \int_0^{t_i} v_{mixed}(1 - \varphi_{CO_2})dt \\ Q_{CH_4-free(i)} = \dfrac{p_i V_3}{Z_{CO_2-i}RT} V_m \cdot (1 - \varphi_{CO_2(i)}) \\ Q_{CH_4-replace(i)} = Q_{CH_4-recovery(i)} - (Q_{CH_4-free} - Q_{CH_4-free(i)}) \\ R_{CH_4-storage(i)} = \dfrac{Q_{CH_4-replace(i)}}{Q_{CH_4-storage}} \times 100\% \end{cases} \quad \text{(VI)}$$

wherein $Z_{CO2\text{-}i}$ represents a compressibility coefficient of the carbon dioxide gas under the pressure $P_i$ directly obtained according to the corresponding relationship diagram between the compressibility coefficient of methane and the pressure; $\varphi_{CO2(i)}$ represents a total amount of carbon dioxide in the mixed gas obtained by the gas chromatograph at time $t_i$; $Q_{CH4\text{-}replace\ (i)}$ represents a total recovery capacity of methane stored in the core specimen at time $t_i$; and $R_{CH4\text{-}storage\ (i)}$ represents a real-time recovery rate of the stored methane at time $t_i$; and when the exhaust gas is unable to monitor methane, considering that the pulsed displacement and replacement of methane with carbon dioxide under the setting conditions is finished, turning off the first stop valve, the second stop valve, the ninth stop valve, the carbon dioxide gas pressure reducing valve and the hydraulic pump, recording the displacement time as $T_N$, then when the reading of the first pressure sensor is equal to the reading of the second pressure sensor and remains stable, recording the pressure as $P_N$; and then obtaining a final recovery rate of the stored methane as $R_{CH4\text{-}storage\text{-}final}$ from the formula (VI);

S7. calculating the displacement evaluation indicator after the displacement is finished: after the displacement is finished, obtaining a total amount of the introduced carbon dioxide as $Q_{CO2}$, an amount of $CO_2$ in the recovered gas as $Q_{CO2\text{-}recovery}$, and an amount of carbon dioxide in the free space of the gas pipeline as $Q_{CO2\text{-}free}$, then obtaining an amount of carbon dioxide stored in the core specimen as $Q_{CO2\text{-}storage}$, and then obtaining a formula (VII) according to the ideal gas state equation:

$$\begin{cases} Q_{CO_2} = \int_0^{t_N} v_{CO_2} dt \\ Q_{CO_2-recovery} = \int_0^{t_N} v_{mixed} \varphi_{CO_2} dt \\ Q_{CO_2-free} = \dfrac{p_N(V_1 + V_2 + V_3)}{Z_{CO_2-N}RT} V_m \\ Q_{CO_2-storage} = Q_{CO_2} - Q_{CO_2-recovery} - Q_{CO_2-free} \end{cases} \quad \text{(VII)}$$

wherein $Z_{CO2\text{-}N}$ represents a compressibility coefficient of the carbon dioxide gas under the pressure $P_N$ directly obtained according to the corresponding relationship diagram between the compressibility coefficient of methane and the pressure; $Q_{CO2}$ represents a total amount of the introduced carbon dioxide; $Q_{CO2\text{-}recovery}$ represents a total amount of carbon dioxide in the recovered gas; $Q_{CO2\text{-}free}$ represents a total amount of carbon dioxide in the free space of the gas pipeline; and $Q_{CO2\text{-}storage}$ represents a total storage capacity of carbon dioxide stored in the core specimen; and when the time is $t_N$, where the displacement is finished, obtaining a total recovery capacity of methane stored in the core specimen as $Q_{CH4\text{-}replace}$ from the formula (VI), and obtaining a displacement and replacement ratio $\beta$:

$$\beta = \frac{Q_{CO_2-storage}}{Q_{CH_4-replace}} \quad \text{(VIII)}$$

wherein $Q_{CO2\text{-}storage}$ represents the total storage capacity of carbon dioxide; and $Q_{CH4\text{-}replace}$ represents the total recovery capacity of the stored methane; and S8. changing the conditions for the next group of experiments: after the above steps S1-S7 are completed, changing the pulse parameters and environmental conditions according to the experimental design scheme, repeating the steps S1-S7 again, thereby simulating the effect of the pulsed displacement and replacement of methane with carbon dioxide under the different pulse parameters and environmental conditions, and determining the carbon dioxide pulsed pressure parameter for the different reservoir environments, thereby improving the methane recovery rate and the exploitation efficiency.

\* \* \* \* \*